US005871267A

United States Patent [19]

Wende

[11] Patent Number: 5,871,267

[45] Date of Patent: Feb. 16, 1999

[54] PROCESS AND DEVICE FOR PRODUCING TWO-OR THREE-DIMENSIONAL IMAGES IN GASEOUS MEDIA

[76] Inventor: Klaus Gustav Wende, Hessstrasse 27, D-80798 München, Germany

[21] Appl. No.: 564,111

[22] PCT Filed: Jul. 9, 1994

[86] PCT No.: PCT/EP94/01888

§ 371 Date: Mar. 25, 1996

§ 102(e) Date: Mar. 25, 1996

[87] PCT Pub. No.: WO94/29837

PCT Pub. Date: Dec. 22, 1994

[30] Foreign Application Priority Data

Jun. 14, 1993 [DE] Germany .......................... 43 19 680.2

[51] Int. Cl.[6] ...................................................... G03B 21/14

[52] U.S. Cl. ............................................... 353/122; 353/62

[58] Field of Search ................................. 353/62, 122, 7, 353/10; 359/204; 348/744

[56] References Cited

U.S. PATENT DOCUMENTS 5,450,147 9/1995 Dorsey-Palmateer ..................... 353/28
5,649,827 7/1997 Suzaki ...................................... 353/28

*Primary Examiner*—William Dowling
*Attorney, Agent, or Firm*—Christensen O'Connor Johnson & Kindness PLLC

[57] ABSTRACT

The invention pertains to a process for producing free-floating luminous letters or two- or three-dimensional images. To do this, laser beams whose emission frequency lies preferably outside the visible spectral range are focused on places where the bright image points are to be produced, thereby generating in the atmosphere light flashes caused, for example, by field ionization of the air molecules and subsequent recombination. The focal point of the laser beams is progressively shifted in lines and columns, thereby composing from individual light flashes an image that is repeated so as to produce a stationary image with an image frequency above 16 Hz.

10 Claims, 2 Drawing Sheets

PROCESS AND DEVICE FOR PRODUCING TWO-OR THREE-DIMENSIONAL IMAGES IN GASEOUS MEDIA

This is a United States national application corresponding to international application PCT/EP94/01888, filed Jun. 9, 1994, which in turn is an international application corresponding to German application No. P43 19 680.2, filed Jun. 14, 1993, the benefit of the filing date of which is hereby claimed under U.S.C. §120.

The invention pertains to a process and a device for producing two- or three-dimensional images in gaseous media, in particular in earth atmosphere.

In the prior art, so-called "floating" images are produced in the sky at night in so-called "laser shows" by means of lasers which work with visible light above the heads of the audience. These images require a projection surface, however, which in most cases is a thin gauze which cannot be seen in the dark night sky and which is partly translucent. In other cases, fog or smoke is used for constructing the image, whereby the laser light is reflected or scattered onto the fog drops or the smoke particles so that the observers can see an image. If fog or clouds of smoke are required to produce an image, this is firstly an interference in itself and secondly the observer, on account of unavoidable scatter light caused by air humidity or dust, sees the laser beam(s) with which the image is then produced at the interference or focusing site of the laser beams. The observer consequently never has the feeling of a self-luminous image appearing freely.

Accordingly, it is the object of the invention to provide measures with which luminous images can be produced in gas-filled space and especially in the atmosphere without projection surfaces or aids such as fog or smoke having to be used for this.

This object is achieved with a process comprising the features stated in patent claim 1.

Further, advantageous embodiments of the process according to the invention and a device suitable for carrying out this process are cited in the subclaims.

Figure 1:
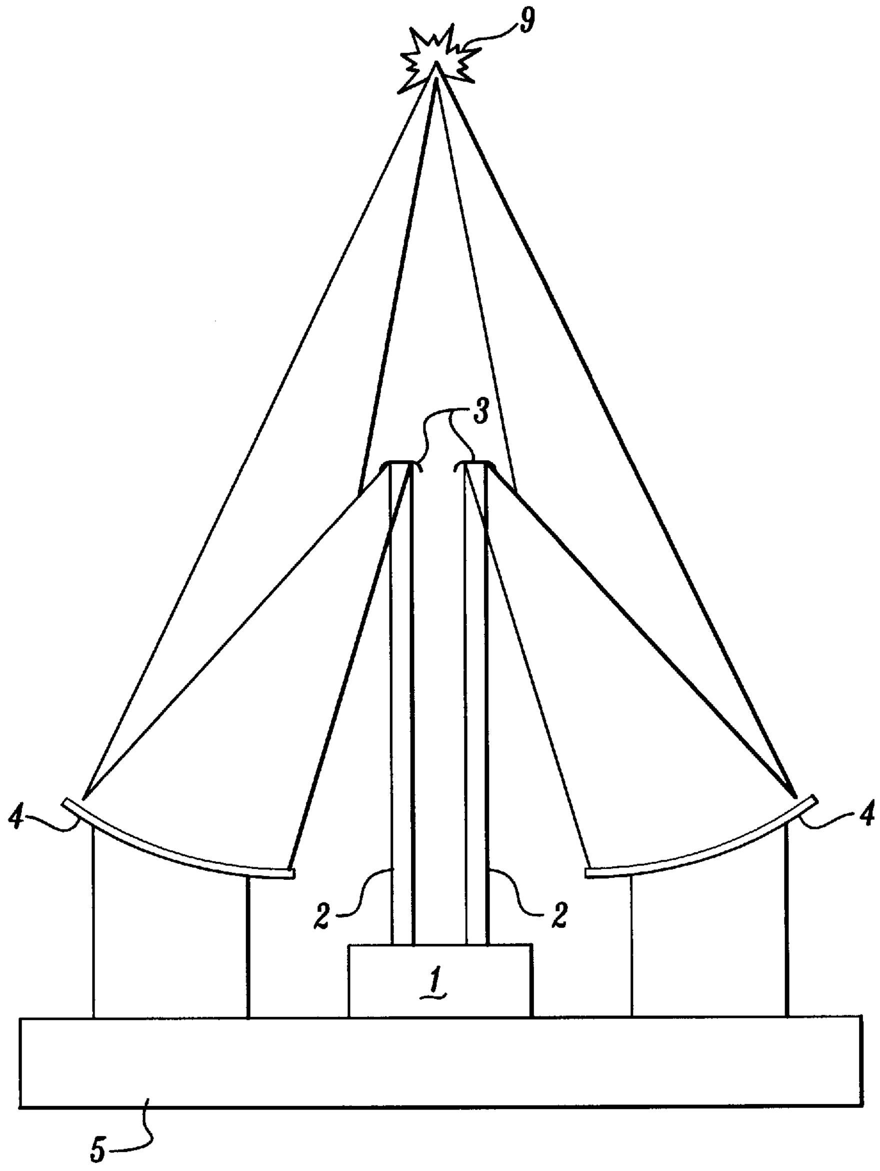
Figure 2:
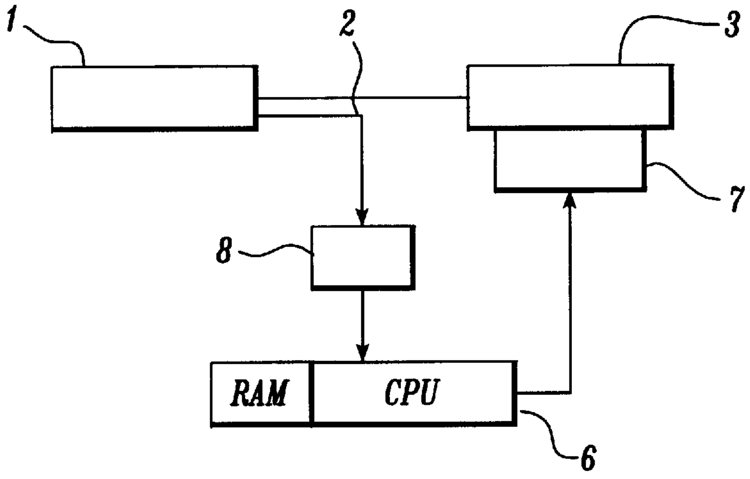

FIG. 1 shows the schematic design of a device according to the invention with two laser-beam deflection systems FIG. 2 shows the same arrangement in a block diagram.

The invention proceeds from the knowledge that nitrogen and oxygen molecules can be ionized in very large electric fields (field ionization) and that on recombination or recapture of an electron energy is set free which is then delivered from the respective molecule as light radiation (light flash) in the visible spectral range. If such luminous phenomena are caused at predetermined points, for example points of a two-dimensional or three-dimensional matrix, a two- or three-dimensional image can be produced. A light spot which is repeated at approx. 25 Hz appears to the observer to be still. The human eye has a resolution of about 1 arc minute. At a distance of 100 m from the image to be produced, a line can thus be drawn if the light spots produced are spaced at about 3 cm.

According to the invention, the light spots are produced by one or several beams of lasers, which preferably emit outside or at the edge of the visible spectral range, being bundled at the respective intended site at which the light spot is to appear. A suitable device is shown in FIG. 1. Laser beams or beam pulses (1) are produced by one or several lasers (1), whose beam cross-section is initially fanned or defocused in an optical device (3), e.g. by means of a mirror or a lens. The bundle of laser beams falls from the diverging mirror (3) onto a focusing mirror (4) which bundles the received laser light and focuses it at a distance of 10–100 m in a small area in which the field intensity is then so high that the atmospheric gases therein, principally nitrogen and oxygen, are ionized. The ionization occurs directly after the laser pulse on account of the high recombination probability. In the arrangement shown in FIG. 1, for example a $CO_2$ beam or also a YAG laser is used. Such a laser emits in the infrared spectral range so that the observers cannot see the laser beam but only the effect it causes, i.e. the light flash (9) or the image composed of such light flashes (9).

The diverging mirrors (3) shown in FIG. 1 can also be used at the same time for beam deflection so that—analogous to the deflection of an electron beam in a black and white television picture—the focusing point of the laser beam pulses scans a predetermined dot matrix and produces light flashes (9) at those matrix dots which are to appear brightly in the image. The focusing mirrors have, for example, a diameter of 30 to 50 cm. Both mirrors, preferably the entire beam deflection system and the laser (1), are to be mounted on a very heavy plate (5) in order to avoid beam deflections which could arise due to ground vibrations. For instance, air-cushioned granite tables of approximately 4 metric tons in weight could be used for mounting the mirrors. Alternatively, steel constructions capable of assembly are conceivable.

The two laser beam bundles shown in FIG. 1 do not necessarily have to be in-phase in the focal point. It is only essential that sufficient molecules of the atmospheric air are ionized. However, if proper phase relation is achieved, an increase in the field intensity at the focal point can be expected and the light efficiency thus increases.

The optical device (3) with which the laser beam bundle are deflected such that their focal points scans the lines and columns of the intended image can be equipped with piezo elements. These piezo elements move the deflecting mirror and thus effect the beam deflection. Scanners, e.g. rotating mirrors with electric coil arrangements, are also possible, the same as so-called Bragg reflectors. The spatial depth, i.e. the third dimension, can be achieved by changing the focal distance of the optical device (zoom).

On an alternative embodiment, the laser beam is sent, after a preamplification, to respective individual parallel amplifiers by means of a mirror system. After a further, for instance tenfold amplification giving a pulse maximum output of 10 MW, the 10 individual laser beams are guided to the common focusing lens by means of separate deflection systems and to the intended image points, for example at about 100 m distance from the focusing lens. Since the repetition frequency of the laser pulses can be 5 kHz, 50,000 light spots per second can be produced with this system. This is sufficient, for example, for producing a free-floating luminous letters display.

In FIG. 2, the components of the deflection device are schematically illustrated. The entire control is synchronized onto the laser beam source (1). For this, electric signals are diverted from the laser pulses with a trigger pulse generator (8) and these signals are utilized in the computer control (6) for triggering the deflection means.

The position data available in a memory unit is called up in the computer control (6) on the trigger pulse and is processed to signals which are supplied to the optical device (3) for adjusting the positioning units for the deflection mirrors. During the adjustment period, the next position data is made available by the memory unit. When the time available for the entire process has lapsed, this being less than 200 ms, the adjustment of the positioning units (7) is concluded and the next light pulse is delivered from the synchronizing source. This light pulse now generates the first image and serves at the same time as a trigger for the adjustment of the next positioning process.

In order to acquire a trigger pulse from the laser beam pulse a phototransistor whose output signal is converted in an A/D converter to a digital signal can be used in the trigger pulse generator.

For the memory unit, a standard office computer with an RAM capacity of over 40 MB can be used for example. The required position data for the image points to be produced is deposited in this memory. One byte contains the information for a positioning unit. In order to store the X and Y coordinates of the image, for example, 4 bytes are required in each case for 16 possible positions. In response to the trigger signal the ready data is transmitted to the positioning units (7). After transmission of the data, the edge position data is made available.

Each positioning unit (7) consists of a separate electric control and a mechanical component. The mechanical component can consist, for example, of a moving magnet which is adjusted by fixed resistances to the 16 possible positions. Alternatively, a servomotor (stepping motor) can also be used, however.

I claim:

1. A process for producing two-dimensional self-luminous images in gaseous media including earth atmosphere, comprising the steps of:

focusing one or more laser beams of a laser, with a frequency outside the visible spectral range, at predetermined image points to ionize atmospheric gas molecules at the predetermined image points; and generating a series of light flashes at the predetermined image points to create a two-dimensional image.

2. A process as claimed in claim 1, wherein the image points are generated by scanning the focal point of the one or more laser beams along the lines and the columns of a two-dimensional image point matrix.

3. A process for producing three-dimensional self-luminous images in gaseous media including earth atmosphere, comprising the steps of:

focusing one or more laser beams of a laser, with a frequency outside the visible spectral range, at predetermined image points to ionize atmospheric gas molecules at the predetermined image points; and generating a series of light flashes at the predetermined image points to create a three-dimensional image.

4. A process as claimed in claim 3, wherein the image points are generated by scanning the focal point of the one or more laser beams along the lines, the columns, and the rows of a three-dimensional image point matrix.

5. A process as claimed in claim 1 or claim 3, wherein the one or more laser beams diverge in an optical device after leaving the laser, and subsequently focus at the predetermined image points by means of a focusing mirror.

6. A process as claimed in claim 5, wherein the optical device simultaneously effects the deflection of the one or more laser beams required for scanning the image.

7. A process as claimed in claim 1 or claim 3, wherein the focal plane of the one or more laser beams is progressively displaced.

8. A process as claimed in claim 1 or claim 3, wherein the laser has a pulse repetition frequency of at least 500 Hz.

9. A process as claimed in claim 1 or claim 3, further comprising the steps of:

supplying the one or more laser beams to corresponding laser amplifiers operating in parallel via a mirrors system;

amplifying the one or more laser beams; and guiding the amplified laser beams to a common focusing lens via built-in defocusing and deflection systems.

10. A device for producing two- or three-dimensional self-luminous images in gaseous media including earth atmosphere, comprising:

one or more lasers which emits one or more laser beams outside the visible spectral range;

an optical device for deflecting the laser beams;

one or more focusing mirrors for receiving the one or more deflected laser beams and focusing the one or more deflected laser beams at predetermined image points;

a trigger pulse generator for generating triggering signals from the laser beams emitted by the laser; and a computer control for producing a control signal derived from position data of the predetermined image points, produced in response to the trigger signal, for a positioning device that adjusts the optical device.

* * * * *